United States Patent
Kaneko et al.

(10) Patent No.: US 12,191,905 B2
(45) Date of Patent: Jan. 7, 2025

(54) OPTICAL COMMUNICATION SYSTEM AND PROTECTION METHOD FOR OPTICAL COMMUNICATION SYSTEM

(71) Applicant: NIPPON TELEGRAPH AND TELEPHONE CORPORATION, Tokyo (JP)

(72) Inventors: Shin Kaneko, Musashino (JP); Kazuaki Honda, Musashino (JP); Hiroo Suzuki, Musashino (JP); Junichi Kani, Musashino (JP); Takuya Kanai, Musashino (JP); Yasunari Tanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 148 days.

(21) Appl. No.: 18/022,887

(22) PCT Filed: Aug. 24, 2020

(86) PCT No.: PCT/JP2020/031844
§ 371 (c)(1),
(2) Date: Feb. 23, 2023

(87) PCT Pub. No.: WO2022/044076
PCT Pub. Date: Mar. 3, 2022

(65) Prior Publication Data
US 2023/0308174 A1    Sep. 28, 2023

(51) Int. Cl.
*H04J 14/02* (2006.01)
*H04B 10/032* (2013.01)
*H04B 10/079* (2013.01)

(52) U.S. Cl.
CPC ..... *H04B 10/032* (2013.01); *H04B 10/07957* (2013.01); *H04J 14/0287* (2013.01)

(58) Field of Classification Search
CPC .......................................... H04J 14/0287–0297
See application file for complete search history.

(56) References Cited

U.S. PATENT DOCUMENTS

| 5,777,761 A | 7/1998 | Fee |
| 8,693,880 B2 * | 4/2014 | Sakauchi ........... H04Q 11/0005 385/24 |
| 2016/0248539 A1 * | 8/2016 | Kaneko ............... H04J 14/0295 |

FOREIGN PATENT DOCUMENTS

| EP | 2525517 A1 | 11/2012 | |
| WO | WO-2004107626 A1 * | 12/2004 | .......... H04J 14/0226 |

OTHER PUBLICATIONS

K. Honda et al., "Wavelength-shifted protection for WDM-PON with AMCC scheme for 5G mobile fronthaul", OFC 2019.

* cited by examiner

*Primary Examiner* — Nathan M Cors

(57) ABSTRACT

The optical communication system includes the optical distribution device (100) provided between the wavelength routing device (30) and the optical multiplexing/demultiplexing device (40). The wavelength routing device outputs the optical signal input from the port on the wavelength variable subscriber device side to the port uniquely determined by a combination of the wavelength of the optical signal and the port to which the optical signal is inputted. The wavelength variable subscriber device can execute the first protection for switching the wavelength of the optical signal to be transmitted and received to the spare wavelength different from the operating wavelength when the wavelength variable subscriber device and the wavelength variable communication device (10) are disconnected. Then, the optical distribution device can execute the second protection for switching the optical fiber transmission path (50) to be used when the wavelength variable subscriber device and (Continued)

the wavelength variable communication device are disconnected.

10 Claims, 6 Drawing Sheets

|  | Port #2-1 | Port #2-2 | Port #2-3 | Port #2-4 | ... | Port #2-N-1 | Port #2-N |
|---|---|---|---|---|---|---|---|
| Port #1-1 | $\lambda_{U\_1}, \lambda_{D\_1}$ | $\lambda_{U\_2}, \lambda_{D\_2}$ | $\lambda_{U\_3}, \lambda_{D\_3}$ | $\lambda_{U\_4}, \lambda_{D\_4}$ | ... | $\lambda_{U\_N-1}, \lambda_{D\_N-1}$ | $\lambda_{U\_N}, \lambda_{D\_N}$ |
| Port #1-2 | $\lambda_{U\_2}, \lambda_{D\_2}$ | $\lambda_{U\_3}, \lambda_{D\_3}$ | $\lambda_{U\_4}, \lambda_{D\_4}$ | $\lambda_{U\_5}, \lambda_{D\_5}$ | ... | $\lambda_{U\_N}, \lambda_{D\_N}$ | $\lambda_{U\_1}, \lambda_{D\_1}$ |

| | Port #2-1 | Port #2-2 | Port #2-3 | Port #2-4 | ... | Port #2-M-1 | Port #2-M |
|---|---|---|---|---|---|---|---|
| Port #1-1 | λu_1, λD_1 | λu_2, λD_2 | λu_3, λD_3 | λu_4, λD_4 | ... | λu_M-1, λD_M-1 | λu_M, λD_M |
| Port #1-2 | λu_2, λD_2 | λu_3, λD_3 | λu_4, λD_4 | λu_5, λD_5 | ... | λu_M, λD_M | λu_1, λD_1 |

OPTICAL COMMUNICATION SYSTEM AND PROTECTION METHOD FOR OPTICAL COMMUNICATION SYSTEM

CROSS-REFERENCE TO RELATED APPLICATIONS

This application is a 371 U.S. National Phase of International Application No. PCT/JP2020/031844, filed on Aug. 24, 2020. The entire disclosure of the above application is incorporated herein by reference.

TECHNICAL FIELD

The present invention relates to an optical communication system and a protection method for the optical communication system.

BACKGROUND ART

In an optical communication system and a protection method for an optical communication system, it is known that an optical fiber transmission path to be used from a normal path to a redundant path by making an optical fiber between a wavelength routing device on a master station side and an optical multiplexing/demultiplexing device on the slave station side redundant and changing a wavelength of an optical signal to be transmitted and received between a wavelength variable communication device and a wavelength variable subscriber device in a WDM (Wavelength Division Multiplexing)-PON which is a kind of PON (Passive Optical Network) in which a wavelength multiplexed optical signal is communicated between a wavelength variable communication device on the master station side and a wavelength variable subscriber device on the slave station side (see NPL 1).

CITATION LIST

Non Patent Literature

[NPL 1] K. Honda et al., "Wavelength-shifted protection for WDM-PON with AMCC scheme for 5G mobile fronthaul", OFC 2019.

SUMMARY OF INVENTION

Technical Problem

However, in the optical communication system and the protection method for the optical communication system as shown in PTL 1, a redundant section is only an optical fiber transmission path connecting the wavelength routing device on the master station side and the optical multiplexing/demultiplexing device on the slave station side, and only protection against disconnection of the core wire of the optical fiber can be realized. Therefore, when the wavelength variable communication device is disabled such as failure, function upgrade, maintenance or the like of the wavelength variable communication device, the opposite wavelength variable subscriber device is not in communication for a long time.

The present disclosure was achieved to solve the foregoing problem. The object is to provide the optical communication system and the protection method for the optical communication system, which can cope with a disconnection due to an abnormality or the like of both the wavelength variable communication device and the optical fiber transmission path and shorten the time required for communication restart between the wavelength variable communication device and the facing wavelength variable subscriber device in any cases of when the wavelength variable communication device is single-unit disabled, the optical fiber transmission path is single-unit disabled, or the wavelength variable communication device and the optical fiber transmission path are multiple disabled.

Solution to Problem

An optical communication system according to the present disclosure includes a plurality of wavelength variable communication devices capable of changing a wavelength of an optical signal to be transmitted, a plurality of wavelength variable subscriber devices capable of changing a wavelength of an optical signal to be transmitted and received, a wavelength routing device connected to each of the wavelength variable communication devices, an optical multiplexing/demultiplexing device connected to each of the wavelength variable subscriber devices, a plurality of optical fiber transmission paths connecting the wavelength routing device and the optical multiplexing/demultiplexing device, and an optical distribution device provided between the wavelength routing device and the optical multiplexing/demultiplexing device, wherein the wavelength routing device outputs an optical signal inputted from a port on the wavelength variable subscriber device side to a port uniquely determined by a combination of a wavelength of the optical signal and a port to which the optical signal is inputted, the wavelength variable subscriber device is capable of executing a first protection for switching a wavelength of the optical signal to be transmitted and received to a spare wavelength different from an operating wavelength when the wavelength variable subscriber device and the wavelength variable communication device are disconnected, and the optical distribution device is capable of executing a second protection for switching the optical fiber transmission path to be used when the wavelength variable subscriber device and the wavelength variable communication device are disconnected.

Alternatively, the optical communication system according to the present disclosure includes the plurality of wavelength variable communication devices capable of changing the wavelength of then optical signal to be transmitted, the plurality of wavelength variable subscriber devices capable of changing the wavelength of the optical signal to be transmitted and received, the wavelength routing device connected to each of the wavelength variable communication devices, the optical multiplexing/demultiplexing device connected to each of the wavelength variable subscriber devices, the plurality of optical fiber transmission paths connecting the wavelength routing device and the optical multiplexing/demultiplexing device, and the optical distribution device provided between the wavelength routing device and each of the wavelength variable communication devices, wherein the wavelength routing device outputs the optical signal inputted from the port on the wavelength variable subscriber device side to the port uniquely determined by a combination of the wavelength of the optical signal and the port to which the optical signal is inputted, the wavelength variable subscriber device is capable of executing the first protection for switching the wavelength of the optical signal to be transmitted and received to the spare wavelength different from the operating wavelength when the wavelength variable subscriber device and the wavelength variable communication device are disconnected, and the optical distribution device is capable of executing the second protection for switching the connection destination of the wavelength variable subscriber device to the wavelength variable communication device different from the disconnected wavelength variable communication device when the wavelength variable subscriber device and the wavelength variable communication device are disconnected.

Alternatively, the optical communication system according to the present disclosure includes the plurality of wavelength variable communication devices capable of changing the wavelength of the optical signal to be transmitted, the plurality of wavelength variable subscriber devices capable of changing the wavelength of the optical signal to be transmitted and received, a first wavelength routing device connected to each of the wavelength variable communication devices, a second wavelength routing device connected to each of the wavelength variable subscriber devices, the plurality of optical fiber transmission paths connecting the first wavelength routing devices and the second wavelength routing devices, and the optical distribution device provided between the first wavelength routing device and each of the wavelength variable communication devices, wherein the first wavelength routing device outputs an optical signal inputted from the port on the wavelength variable subscriber device side to the port uniquely determined by a combination of the wavelength of the optical signal and the port to which the optical signal is inputted, the second wavelength routing device outputs the optical signal inputted from the port on the wavelength variable communication device side to the port uniquely determined by a combination of the wavelength of the optical signal and the port to which the optical signal is inputted, and the wavelength variable subscriber device, the wavelength variable communication device are capable of executing the first protection for switching the wavelength of the respective optical signal to be transmitted and received to the spare wavelength different from the operating wavelength when the wavelength variable subscriber device and the wavelength variable communication device are disconnected, and the optical distribution device is capable of executing the second protection for switching the connection destination of the wavelength variable subscriber device to the wavelength variable communication device different from the disconnected wavelength variable communication device when the wavelength variable subscriber device and the wavelength variable communication device are disconnected.

In addition, a protection method for the optical communication system according to the present disclosure includes the plurality of wavelength variable communication devices capable of changing the wavelength of the optical signal to be transmitted, the plurality of wavelength variable subscriber devices capable of changing the wavelength of the optical signal to be transmitted and received, the wavelength routing device connected to each of the wavelength variable communication devices, the optical multiplexing/demultiplexing device connected to each of the wavelength variable subscriber devices, the plurality of optical fiber transmission paths connecting the wavelength routing device and the optical multiplexing/demultiplexing device, and the optical distribution device provided between the wavelength routing device and the optical multiplexing/demultiplexing device, wherein the wavelength routing device executes, in an arbitrary order, in the optical communication system in which the optical signal inputted from the port of the wavelength variable subscriber device side is output to the port uniquely determined by a combination of the wavelength of the optical signal and the port to which the optical signal is inputted, a first step in which the wavelength variable subscriber device switches the wavelength of the optical signal to be transmitted and received to the spare wavelength different from the operating wavelength when the wavelength variable subscriber device and the wavelength variable communication device are disconnected, and a second step in which the optical distribution device switches the optical fiber transmission path to be used when the wavelength variable subscriber device and the wavelength variable communication device are disconnected.

Alternatively, the protection method for the optical communication system according to the present disclosure includes the plurality of wavelength variable communication devices capable of changing the wavelength of the optical signal to be transmitted, the plurality of wavelength variable subscriber devices capable of changing the wavelength of the optical signal to be transmitted and received, the wavelength routing device connected to each of the wavelength variable communication devices, the optical multiplexing/demultiplexing device connected to each of the wavelength variable subscriber devices, the plurality of optical fiber transmission paths connecting the wavelength routing device and the optical multiplexing/demultiplexing device, and the optical distribution device provided between the wavelength routing device and each of wavelength variable communication devices, wherein the wavelength routing device executes, in an arbitrary order, in the optical communication system in which the optical signal inputted from the port of the wavelength variable subscriber device side is output to the port uniquely determined by a combination of the wavelength of the optical signal and the port to which the optical signal is inputted, a first step in which the wavelength variable subscriber device switches the wavelength of the optical signal to be transmitted and received to the spare wavelength different from the operating wavelength when the wavelength variable subscriber device and the wavelength variable communication device are disconnected, and a second step in which the optical distribution device switches the connection destination of the wavelength variable subscriber device to the wavelength variable communication device different from the disconnected wavelength variable communication device when the wavelength variable subscriber device and the wavelength variable communication device are disconnected.

Alternatively, the protection method for the optical communication system according to the present disclosure includes the plurality of wavelength variable communication devices capable of changing the wavelength of the optical signal to be transmitted, the plurality of wavelength variable subscriber devices capable of changing the wavelength of the optical signal to be transmitted and received, the first wavelength routing device connected to each of the wavelength variable communication devices, the second wavelength routing device connected to each of the wavelength variable subscriber devices, the plurality of optical fiber transmission paths connecting the first wavelength routing device and the second wavelength routing device, and the optical distribution device provided between the first wavelength routing device and each of wavelength variable communication devices, wherein in the optical communication system in which the first routing device outputs the optical signal inputted from the port of the wavelength variable subscriber device side to the port uniquely determined by a combination of a wavelength of the optical signal and the port to which the optical signal is inputted and the second routing device outputs the optical signal inputted from the port of the wavelength variable communication device side to the port uniquely determined by a combination of a wavelength of the optical signal and a port to which the optical signal is inputted, the wavelength variable subscriber device and the wavelength variable communication device executes, in an arbitrary order, the first step in which the wavelength variable subscriber device and the wavelength variable communication device switch the optical signal transmitted by each of the wavelength variable subscriber devices and the wavelength variable communication devices to the spare wavelength different from the operating wavelength when the wavelength variable subscriber device and the wavelength variable communication device are disconnected, and the second step in which the optical distribution device switches the connection destination of the wavelength variable subscriber device to the wavelength variable communication device different from the disconnected wavelength variable communication device when the wavelength variable subscriber device and the wavelength variable communication device are disconnected.

Advantageous Effects of Invention

According to the optical communication system and the protection method for the optical communication system of the present disclosure, in any cases of when the wavelength variable communication device is single-unit disabled, the optical fiber transmission path is single-unit disabled, or the wavelength variable communication device and the optical fiber transmission path are multiple disabled, the time required for communication restart between the wavelength variable communication device and the facing wavelength variable subscriber device can be shortened.

BRIEF DESCRIPTION OF DRAWINGS

FIG. 2 is a diagram showing an example of input/output characteristics of the wavelength routing device provided in the optical communication system according to the first embodiment.

FIG. 5 is a diagram showing an example of input/output characteristics of the wavelength routing device provided in the optical communication system according to the second embodiment.

DESCRIPTION OF EMBODIMENTS

Modes for carrying out the optical communication system and the protection method for the optical communication system according to the present disclosure will be described with reference to the drawings. In each figure, same numerals are assigned to identical or corresponding parts and repetition of description will be simplified or omitted. In the following description, for convenience, the positional relationship of each structure may be expressed with reference to the state shown in the figure. It should be noted that the present disclosure is not limited to the following embodiments, and within the scope not departing from the spirit of the present disclosure, any combination of the embodiments, any modification of component of the embodiments, or omission of any constituted component of the embodiments can be performed.

First Embodiment

Figure 1:
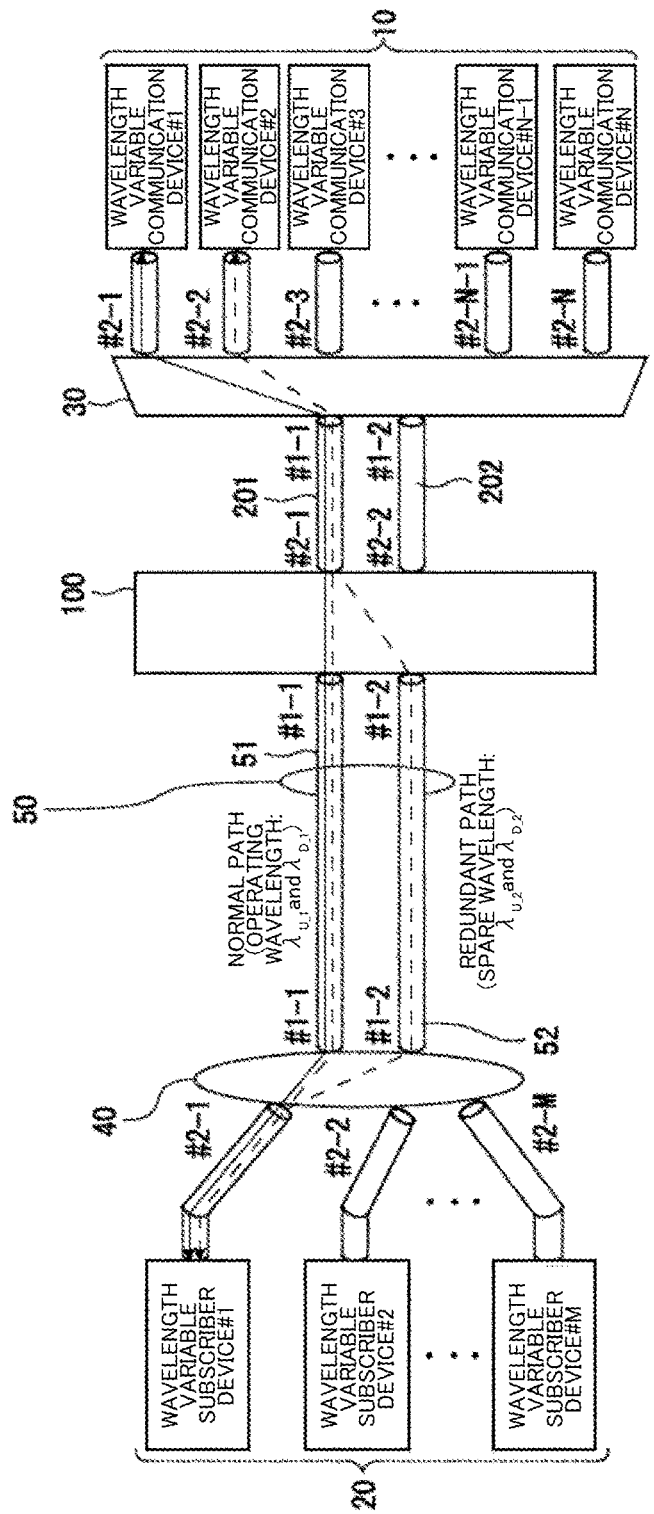
FIG. 1 is a diagram schematically showing an entire configuration of an optical communication system according to a first embodiment.
Figure 3:
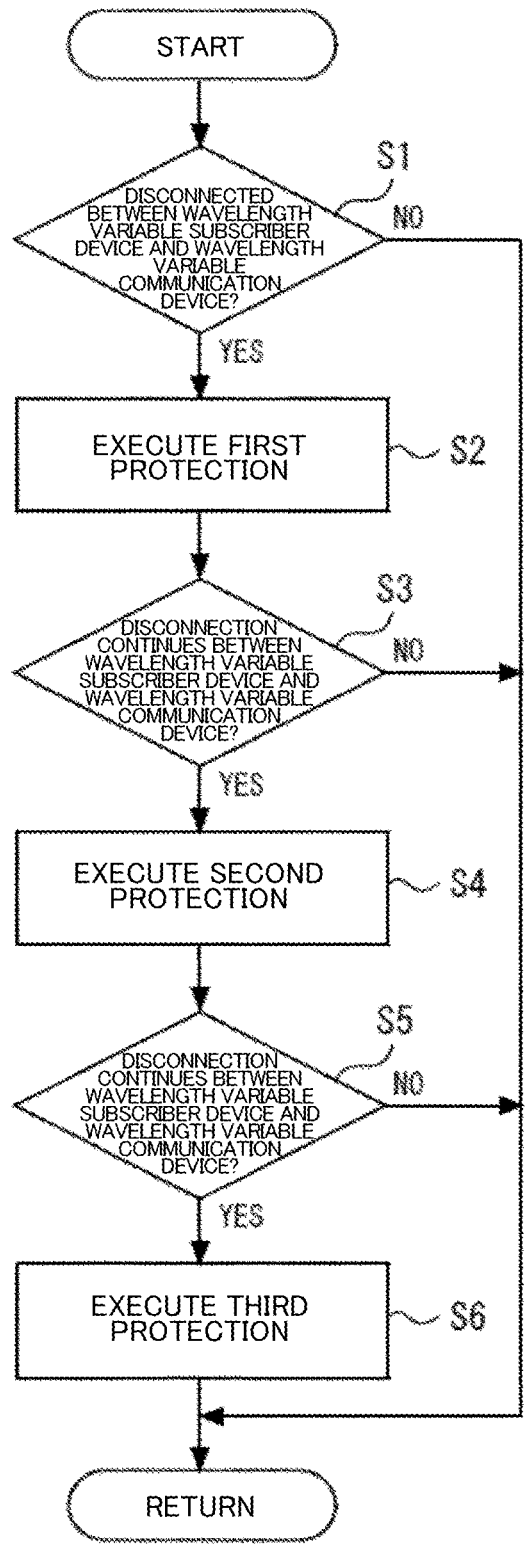
FIG. 3 is a diagram showing an example of an operation of the optical communication system according to the first embodiment.

Embodiment 1 of the present disclosure will be described with reference to FIGS. 1 to 3. FIG. 1 is a diagram schematically showing an entire configuration of the optical communication system. FIG. 2 is a diagram showing an example of input/output characteristics of the wavelength routing device provided in the optical communication system. FIG. 3 is a diagram showing an example of an operation of the optical communication system.

The optical communication system according to this embodiment is a communication system for communicating an optical signal between the wavelength variable communication device 10 and the wavelength variable subscriber device 20. As shown in FIG. 1, the optical communication system includes the plurality of wavelength variable communication devices 10 and the plurality of wavelength variable subscriber devices 20. In the shown example, N sets of wavelength variable communication devices 10 are provided. M sets of wavelength variable subscriber devices 20 are provided. N and M are integers that are 2 or more.

In order to distinguish the respective wavelength variable communication devices 10, serial numbers are assigned to the respective wavelength variable communication devices 10 for convenience, and the respective wavelength variable communication devices 10 are assigned to the wavelength variable communication devices 10 #1, the wavelength variable communication device 10 #2, . . . , the wavelength variable communication device 10 #N−1, the wavelength variable communication device 10 #N. Similarly, in order to distinguish each wavelength variable subscriber device 20, serial numbers are assigned to the respective wavelength variable subscriber devices 20 for convenience, and the respective wavelength variable subscriber devices 20 are assigned to the wavelength variable subscriber device 20 #1, the wavelength variable subscriber device 20 #2, . . . , the wavelength variable subscriber device 20 #M−1, the wavelength variable subscriber device 20 #M.

Each of the wavelength variable communication devices 10 is connected to, for example, one common master station device (not shown). Each of the wavelength variable subscriber devices 20 is connected to, for example, a respective slave station device (not shown).

In this embodiment, each of the wavelength variable communication devices 10 can change the wavelength of an optical signal to be transmitted toward the wavelength variable subscriber device 20. Each wavelength variable communication device 10 can receive an optical signal of a preset specific wavelength. Here, it is assumed that the wavelength of the optical signal to be transmitted by the wavelength variable communication device 10 #1 is set to $\lambda D\_1$, and the wavelength of the optical signal receivable by the wavelength variable communication device 10 #1 is $\lambda U\_1$. Similarly, it is assumed that the wavelength of the optical signal to be transmitted by the wavelength variable communication device 10 #2 is set to $\lambda D\_2$, and the wavelength of the optical signal receivable by the wavelength variable communication device 10 #2 is set to $\lambda U\_2$. Then, it is assumed that the wavelength of the optical signal to be transmitted by the wavelength variable communication device 10 #N is set to λD_N, and the wavelength of the optical signal receivable by the wavelength variable communication device 10 #N is set to λU_N.

Each wavelength variable subscriber device 20 can change the wavelength of the optical signal to be transmitted and received. That is, each wavelength variable subscriber device 20 can change the wavelength of the optical signal to be transmitted toward the wavelength variable communication device 10. Each wavelength variable subscriber device 20 can change the wavelength of the optical signal to be received. That is, each wavelength variable subscriber device 20 selectively receives signal light of one wavelength channel from a wavelength multiplexed signal (WDM signal) obtained by multiplexing a plurality of wavelength channels. Then, each wavelength variable subscriber device 20 can change and set a wavelength channel to be selectively received. Here, for example, it is assumed that the operating wavelength of the wavelength variable subscriber device 20 #1 is λU_1 in the upward direction and λD_1 in the downward direction. In the same way, the operating wavelength is set for the other wavelength variable subscriber devices 20.

The optical communication system includes a wavelength routing device 30, an optical multiplexing/demultiplexing device 40, and an optical fiber transmission path 50. The wavelength variable communication device 10 and the wavelength variable subscriber device 20 are communicably connected through the wavelength routing device 30, the optical multiplexing/demultiplexing device 40 and the optical fiber transmission path 50. The wavelength routing device 30 is connected to each wavelength variable communication device 10. The optical multiplexing/demultiplexing device 40 is connected to each wavelength variable subscriber device 20. The wavelength routing device 30 and the optical multiplexing/demultiplexing device 40 are connected by the plurality of optical fiber transmission paths 50. In the example of the configuration described here, two of a normal path 51 and a redundant path 52 are laid as the plurality of optical fiber transmission paths 50.

The optical communication system further includes an optical distribution device 100. In this embodiment, the optical distribution device 100 is provided between the wavelength routing device 30 and the optical multiplexing/demultiplexing device 40. A port on the wavelength variable communication device 10 side of the optical distribution device 100 is connected to the wavelength routing device 30 via a first signal transmission path 201 and a second signal transmission path 202 which are signal transmission paths 200. That is, the wavelength routing device 30 and the optical distribution device 100 are connected by the plurality of signal transmission paths 200. The normal path 51 and the redundant path 52, which are the plurality of optical fiber transmission paths 50, are connected to a port on the wavelength variable subscriber device 20 side of the optical distribution device 100.

In the shown example of the configuration, for the wavelength variable communication device 10 side of the optical multiplexing/demultiplexing device 40, the port #1-1 is connected to the normal path 51 of the optical fiber transmission path 50, and the port #1-2 is connected to the redundant path 52 of the optical fiber transmission path 50. Further, ports #2-1, #2-2, ..., #2-M on the wavelength variable subscriber device 20 side in the optical multiplexing/demultiplexing device 40 are connected to the wavelength variable subscriber device 20 #1, the wavelength variable subscriber device 20 #2, ..., the wavelength variable subscriber device 20 #M, respectively.

Then, the optical multiplexing/demultiplexing device 40 branches the light inputted from the one side port and outputs it to each of the opposite side ports. For example, the light inputted to the port #1-1 of the optical multiplexing/demultiplexing device 40 is branched regardless of the wavelength and outputted to each port of #2-1 to #2-M. The light inputted to the port #2-1 of the optical multiplexing/demultiplexing device 40 is branched regardless of the wavelength and outputted to each port of #1-1 or #1-2.

In the shown example of the configuration, for the wavelength variable subscriber device 20 side of the optical distribution device 100, the port #1-1 is connected to the normal path 51 of the optical fiber transmission path 50, and the port #1-2 is connected to the redundant path 52 of the optical fiber transmission path 50. For the wavelength variable communication device 10 side of the optical distribution device 100, the first signal transmission path 201 is connected to the port #2-1, and the second signal transmission path 202 is connected to the port #2-2.

Then, the optical distribution device 100 outputs the optical signals inputted from the respective ports to the ports whose connection relation is set as connection ports to the ports. The connection relation between the ports in the optical distribution device 100 can be arbitrarily changed and set. As the optical distribution device 100, for example, a spatial type optical switch using a micro electro mechanical systems (MEMS) or the like, a waveguide type optical switch using a planar lightwave circuit (PLC) or the like, etc. can be used.

In the shown example of the configuration, for the wavelength variable subscriber device 20 side of the wavelength routing device 30, the port #1-1 is connected to the first signal transmission path 201 and the port #1-2 is connected to the second signal transmission path 202. Furthermore, the port #2-1, #2-2, ..., #2-N−1, #2-N on the wavelength variable communication device 10 side of the wavelength routing device 30 are connected to the wavelength variable communication device 10 #1, the wavelength variable communication device 10 #2, ..., the wavelength variable communication device 10 #N−1, the wavelength variable communication device 10 #N, respectively.

Then, the wavelength routing device 30 outputs the optical signals inputted to the ports #1-1, #1-2 on the wavelength variable subscriber device 20 side to the ports uniquely determined by a combination of a wavelength of the optical signal and the port to which the optical signal is inputted on the wavelength variable communication device 10 side. Further, the wavelength routing device 30 outputs the optical signals inputted to each of the ports #2-1 to #2-N on the wavelength variable communication device 10 side to the ports uniquely determined by a combination of a wavelength of the optical signal and a port to which the optical signal is inputted on the wavelength variable subscriber device 20 side. FIG. 2 shows an example of input/output characteristics of the wavelength routing device 30. As shown in FIG. 2, the wavelength routing device 30 outputs, for example, light having a wavelength λU_1 inputted from the port #1-1 to the port #2-1. Then, the wavelength routing device 30 outputs the light of the wavelength λD_1 inputted from the port #2-1 to the port #1-1. In addition, for example, the wavelength routing device 30 outputs the light of the wavelength λU_2 inputted from the port #1-2 to the port #2-1. Then, the wavelength routing device 30 outputs the light of the wavelength λD_2 inputted from the port #2-1 to the port #1-2.

The optical communication system configured as the above description is so-called a PON (Passive Optical Network) system. Then, each wavelength variable subscriber device 20 sets the transmission wavelength and the reception wavelength to the assigned operating wavelength, thereby logically realizing point-to-point communication with the facing wavelength variable communication device 10.

Next, the protection when communication between the wavelength variable subscriber device 20 and the wavelength variable communication device 10 is disconnected in the optical communication system of this embodiment will be described. In the optical communication system of this embodiment, at least the first protection and the second protection can be executed.

First, in the first protection, the wavelength of the optical signal to be transmitted and received is switched from the operating wavelength to the spare wavelength when the wavelength variable subscriber device 20 and the facing wavelength variable communication device 10 are disconnected. Here, the spare wavelength is different from the operating wavelength. In order to switch the wavelength to be transmitted and received to the spare wavelength by the wavelength variable subscriber device 20, it is necessary for the wavelength variable subscriber device 20 to recognize the spare wavelength. Therefore, for example, by notifying the wavelength variable subscriber device 20 of the spare wavelength in advance, the transmission wavelength can be autonomously switched to the spare wavelength when the wavelength variable subscriber device 20 recognizes the communication interruption. That is, the wavelength variable subscriber device 20 can execute the first protection for switching the wavelength of an optical signal to be transmitted and received to the spare wavelength different from the operating wavelength when the wavelength variable subscriber device 20 and the wavelength variable communication device 10 are disconnected.

For example, when a state in which the wavelength variable subscriber device 20 does not receive an optical signal from the facing wavelength variable communication device 10 continues for a wavelength variable predetermined time period or longer, the wavelength variable subscriber device 20 switches a wavelength channel selectively received and then recognizes spare wavelength information carried on the wavelength channel, and the wavelength variable subscriber device 20 can recognize the spare wavelength. As the means for carrying the spare wavelength information on the wavelength channel, a control frame of the same frequency band as that of the client signal (for example, Ethernet OAM (Ethernet is a registered trademark)), or may be notified by using a control channel which does not interfere the frequency band of the client signal (for example, AMCC (Auxiliary Management and Control Channel)).

As described above, the wavelength routing device 30 outputs the optical signals inputted to the ports #1-1, #1-2 on the wavelength variable subscriber device 20 side to the ports uniquely determined by a combination of a wavelength of the optical signal and a port to which the optical signal is inputted on the wavelength variable communication device 10 side. Therefore, when the wavelength variable subscriber device 20 executes the first protection and the transmission/reception wavelength of the wavelength variable subscriber device 20 is switched to the spare wavelength, the facing device of the wavelength variable subscriber device 20 becomes the wavelength variable communication device 10 different from the wavelength variable communication device 10 before switching. That is, the wavelength variable communication device 10 connected to a path through which the spare wavelength communicates in the wavelength routing device 30 becomes a new facing device of the wavelength variable subscriber device 20 in which communication is disconnected.

For example, when communication between the wavelength variable subscriber device 20 #1 and the wavelength variable communication device 10 #1 is disconnected, the wavelength variable subscriber device 20 #1 executes the first protection, and thereby the wavelength variable subscriber device 20 #1 switches the transmission/reception wavelength from the operating wavelength ($\lambda U\_1$ and $\lambda D\_1$) to the spare wavelength ($\lambda U\_2$ and $\lambda D\_2$). According to the input/output characteristics of FIG. 2, the optical signal of the spare wavelength ($\lambda U\_2$ and $\lambda D\_2$) inputted/outputted from and to the port #1-1 of the wavelength routing device 30 is inputted/outputted from the port #2-2 of the wavelength routing device 30 to the wavelength variable communication device 10 #2. Therefore, the wavelength variable communication device 10 #2 becomes a new facing device of the wavelength variable subscriber device #1.

Next, in the second protection, the optical distribution device 100 switches the optical fiber transmission path 50 to be used when the wavelength variable subscriber device 20 and the wavelength variable communication device 10 are disconnected. In the example of the configuration described here, there are the normal path 51 and the redundant path 52 as the optical fiber transmission path 50. When the wavelength variable subscriber device 20 and the wavelength variable communication device 10 are disconnected, the optical distribution device 100 can execute the second protection in which the connection port corresponding to the port to which an optical signa to be transmitted from the wavelength variable communication device 10 is switched from the port 1 #1 connected to the normal path 51 to the port #1-2 connected to the redundant path 52.

Further, in the optical communication system of this embodiment, a third protection may be executed. In the third protection, the optical distribution device 100 switches the signal transmission path 200 to be used when the wavelength variable subscriber device 20 and the wavelength variable communication device 10 are disconnected. When the wavelength variable subscriber device 20 and the wavelength variable communication device 10 are disconnected, the optical distribution device 100 can execute the third protection in which the optical distribution device 100 switches the connection port to which an optical signal to be transmitted from the wavelength variable communication device 10 from the port #2-1 connected to the first signal transmission path 201 to the port #2-2 connected to the second signal transmission path 202.

The wavelength variable subscriber device 20 and the optical distribution device 100 are provided with a computer having, for example, a processor and a memory as hardware. The processor is also called a CPU (Central Processing Unit), a central processing unit, a processing unit, an arithmetic unit, a microprocessor, a microcomputer or a DSP. For the memory, for example, a RAM, a ROM, a flash memory, a non-volatile or volatile semiconductor memory such as EPROM and EEPROM, or a magnetic disc, an optical disc, a flexible disc, an optical disc, a compact disc, a mini disc, a DVD and the like are applicable.

A program as software is stored in the memories of the wavelength variable subscriber device 20 and the optical distribution device 100. Then, the wavelength variable subscriber device 20 and the optical distribution device 100 execute preset processing by executing the program stored in the memory by the processor, and as a result of cooperation between hardware and software, a function of controlling execution of the first protection, the second protection and the third protection is realized.

Alternatively, the optical communication system may control execution of the first protection, the second protection and the third protection by a control unit (not shown). Also in this case, the control unit (not shown) is provided with a computer having, for example, a processor and a memory as hardware. Then, the processor executes a program stored in a memory of the control unit to perform preset processing, and as a result of cooperation of hardware and software, a function for controlling execution of the first protection, the second protection and the third protection is realized.

Next, a description will be given of an example of an operation procedure of the optical communication system that is configured as described above with reference to FIG. 3. First, in a step S1, if no disconnection occurs between the wavelength variable communication device 10 and the wavelength variable subscriber device 20, a series of operations are terminated. On the other hand, if there is a disconnection between the wavelength variable communication device 10 and the wavelength variable subscriber device 20, the processing proceeds to a step S2, and the wavelength variable subscriber device 20 which has a disconnection with the facing wavelength variable communication device 10 executes the first protection.

In the following step S3, if the wavelength variable communication device 10 and the wavelength variable subscriber device 20 are not disconnected, it is determined that the communication is recovered, and a series of operations are terminated. On the other hand, when the disconnection between the wavelength variable communication device 10 and the wavelength variable subscriber device 20 is continued in the step S3, the processing proceeds to a step S4, and the optical distribution device 100 executes the second protection. Then, in the following step S5, if the wavelength variable communication device 10 and the wavelength variable subscriber device 20 are not disconnected, it is determined that the communication is recovered, and a series of operations are terminated. On the other hand, if the disconnection between the wavelength variable communication device 10 and the wavelength variable subscriber device 20 is still continued in the step S5, the processing proceeds to a step S6, and the optical distribution device 100 executes the third protection. When the processing of the step S6 is terminated, a series of operations are terminated.

The execution order of the first protection of the step S2, the second protection of the step S4, and the third protection of the step S6 is not limited to the example shown in FIG. 3. That is, the first protection, the second protection, and the third protection may be executed in an arbitrary order.

In the protection method of the optical communication system described above, at least the first step of executing the first protection and the second step of executing the second protection are executed in an arbitrary order. Further, a third step of executing the third protection described above may be provided, and in this case, the first step, the second step, and the third step are executed in an arbitrary order.

In the optical communication system and the protection method for the optical communication system of the present embodiment, at least the first protection for switching the wavelength of an optical signal to be transmitted and received to the spare wavelength different from the operating wavelength by the wavelength variable subscriber device 20 and the second protection for switching the optical fiber transmission path 50 used for communication by the optical distribution device 100 can be executed when the wavelength variable subscriber device 20 and the wavelength variable communication device 10 are disconnected.

By executing such first protection, the wavelength variable communication device 10 facing the wavelength variable subscriber device 20 can be changed to a new one, and it is possible to cope with a disconnection due to an abnormality or the like of the facing wavelength variable communication device 10. Further, by executing the second protection, the optical fiber transmission path 50 is switched from the normal path 51 to the redundant path 52, and it is possible to cope with a disconnection due to the abnormality or the like of the optical fiber transmission path 50.

Therefore, it is possible to cope with the disconnection due to the abnormality of both the wavelength variable communication device 10 and the optical fiber transmission path 50. Therefore, in any case of when the wavelength variable communication device 10 is single-unit disabled, the optical fiber transmission path 50 is single-unit disabled, or the wavelength variable communication device 10 and the optical fiber transmission path 50 are multiple disabled, the communication can be restarted within a short time period. Specifically, for example, in not only disconnection of an optical fiber transmission path 50 between the optical multiplexing/demultiplexing device 40 and the optical distribution device 100, but also failure, function upgrade, maintenance, and the like of the wavelength variable communication device 10, the communication disconnection time period can be shortened. Furthermore, the number of wavelength variable subscriber devices 20 to be protection target can be minimized.

Further, in the optical communication system and the protection method for the optical communication system of this embodiment, the third protection for switching the signal transmission path 200 used for communication between the optical distribution device 100 and the wavelength routing device 30 may be executable when the wavelength variable subscriber device 20 and the wavelength variable communication device 10 are disconnected. By making it possible to execute such third protection, the communication path can be made redundant in addition to the optical fiber transmission path 50 between the optical multiplexing/demultiplexing device 40 and the optical distribution device 100, and also in the section between the optical distribution device 100 and the wavelength routing device 30.

Second Embodiment

Figure 4:
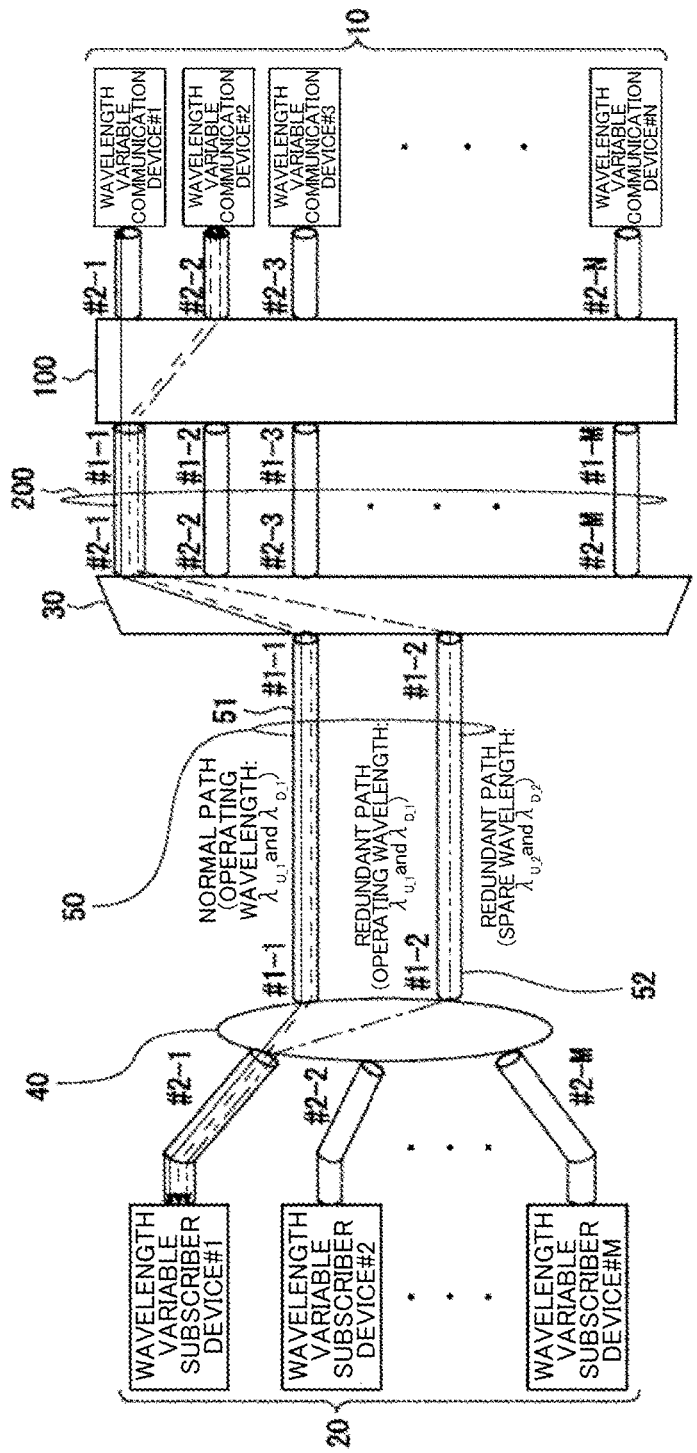
FIG. 4 is a diagram schematically showing an entire configuration of an optical communication system according to a second embodiment.

A second embodiment of the present disclosure will be described with reference to FIGS. 4 and 5. FIG. 4 is a diagram schematically showing an entire configuration of the optical communication system. FIG. 5 is a diagram showing an example of input/output characteristics of the wavelength routing device provided in the optical communication system.

In the second embodiment described here, the optical distribution device is provided between the wavelength routing device and each of the wavelength variable communication devices in the configuration of the first embodiment described above. The optical communication system and the protection method of the optical communication system according to the second embodiment will be described mainly with respect to the difference from the first embodiment. The structure in which the description is omitted is basically the same as that of the first embodiment. In the following description, structures similar to or corresponding to those of the first embodiment will be described with the same reference numerals as those used in the description of the first embodiment in principle.

As shown in FIG. 4, the optical communication system according to this embodiment includes a plurality of wavelength variable communication devices 10, a plurality of wavelength variable subscriber devices 20, a wavelength routing device 30, an optical multiplexing/demultiplexing device 40 and an optical distribution device 100. In this embodiment, each of the wavelength variable communication devices 10 can change the wavelength of the optical signal to be transmitted. The wavelength routing device 30 and the optical multiplexing/demultiplexing device 40 are connected by a plurality of optical fiber transmission paths 50. In the example of the configuration described here, two of a normal path 51 and a redundant path 52 are laid as a plurality of optical fiber transmission paths 50.

In this embodiment, the optical distribution device 100 is provided between the wavelength routing device 30 and each of the wavelength variable communication devices 10. A port on the wavelength variable subscriber device 20 side of the optical distribution device 100 is connected to a wavelength routing device 30 via a plurality of signal transmission paths 200. A port on the wavelength variable communication device 10 side of the optical distribution device 100 is connected to each wavelength variable communication device 10.

In the shown example of the configuration, for the wavelength variable subscriber device 20 side of the wavelength routing device 30, the port #1-1 is connected to the normal path 51 of the optical fiber transmission path 50, and the port #1-2 is connected to the redundant path 52 of the optical fiber transmission path 50. The ports #2-1, #2-2, ..., #2-M on the wavelength variable communication device 10 side of the wavelength routing device 30 are connected to the ports #1-1, #1-2, ..., #1-M on the wavelength variable subscriber device 20 side of the optical distribution device 100 by M signal transmission paths 200, respectively. Then, ports #2-1, #2-2, ..., #2-N on the wavelength variable communication device 10 side of the optical distribution device 100 are connected to the wavelength variable communication device 10 #1, the wavelength variable communication device 10 #2, ..., the wavelength variable communication device 10 #N, respectively.

The optical distribution device 100 outputs the optical signal inputted from the respective ports to a port in which a connection relation is set as a connection port to the port. The connection relation between the ports in the optical distribution device 100 can be arbitrarily changed and set.

The wavelength routing device 30 outputs the optical signals inputted to the ports #1-1, #1-2 on the wavelength variable subscriber device 20 side to the ports uniquely determined by a combination of a wavelength of the optical signal and a port to which the optical signal is inputted on the wavelength variable communication device 10. Further, the wavelength routing device 30 outputs the optical signals inputted to each of the ports #2-1 to #2-M on the wavelength variable communication device 10 side to the ports uniquely determined by a combination of a wavelength of the optical signal and a port to which the optical signal is inputted on the wavelength variable subscriber device 20 side. FIG. 5 shows an example of input/output characteristics of the wavelength routing device 30. As shown in FIG. 5, the wavelength routing device 30 outputs, for example, light having a wavelength $\lambda U\_1$ inputted from the port #1-1 to the port #2-1. Then, the wavelength routing device 30 outputs the light of the wavelength $\lambda D\_1$ inputted from the port #2-1 to the port #1-1. In addition, for example, the wavelength routing device 30 outputs the light of the wavelength $\lambda U\_2$ inputted from the port #1-2 to the port #2-1. Then, the wavelength routing device 30 outputs the light of the wavelength $\lambda D\_2$ inputted from the port #2-1 to the port #1-2.

Next, protection when communication between the wavelength variable subscriber device 20 and the wavelength variable communication device 10 is disconnected in the optical communication system of this embodiment will be described. In the optical communication system of this embodiment, at least the first protection and the second protection can be executed.

First, in the first protection, the wavelength variable subscriber device 20 switches the wavelength of the optical signal to be transmitted and received from the operating wavelength to the spare wavelength when the wavelength variable subscriber device 20 and the facing wavelength variable communication device 10 are disconnected. Here, the spare wavelength is different from the operating wavelength. That is, the wavelength variable subscriber device 20 can execute the first protection for switching the wavelength of an optical signal to be transmitted and received to the spare wavelength different from the operating wavelength when the wavelength variable subscriber device 20 and the wavelength variable communication device 10 are disconnected.

As described above, the wavelength routing device 30 outputs the optical signals inputted to the ports #1-1, #1-2 on the wavelength variable subscriber device 20 side to the ports #2-1 to #2-M on the wavelength variable communication device 10 side according to the input/output characteristics shown in FIG. 5. The input/output characteristics of the wavelength routing device 30 are set so that the output port when the operating wavelength is inputted to the port #1-1 and the output port when the spare wavelength is inputted to the port #1-2 are the same for each of the wavelength variable subscriber devices 20. Therefore, when the wavelength of the optical signal to be transmitted and received by the wavelength variable subscriber device 20 is switched from the operating wavelength to the spare wavelength, if the second protection described later is not executed, the wavelength variable communication device 10 facing the wavelength variable subscriber device 20 is not changed, and the optical fiber transmission path 50 to be used can be switched from the normal path 51 to the redundant path 52.

For example, when communication between the wavelength variable subscriber device 20 #1 and the wavelength variable communication device 10 #1 is disconnected, the wavelength variable subscriber device 20 #1 executes the first protection, and thereby the wavelength variable subscriber device 20 #1 switches the transmission/reception wavelength from the operating wavelength ($\lambda U\_1$ and $\lambda D\_1$) to the spare wavelength ($\lambda U\_2$ and $\lambda D\_2$). Then, according to the input/output characteristics of FIG. 5, the optical signals of the spare wavelengths ($\lambda U\_2$ and $\lambda D\_2$) inputted/outputted to and from the port #1-2 of the wavelength routing device 30, are inputted/outputted from the port #2-1 of the wavelength routing device 30 to the port #1-1 of the optical distribution device 100. Then, the optical signal inputted/outputted to and from the port #1-1 of the optical distribution device 100 is inputted/outputted to and from the wavelength variable communication device 101. Communication by the redundant path 52 can be started by switching the transmission and reception wavelength of the wavelength variable communication device 10 #1 from the operating wavelength (λU_1 and λD_1) to the spare wavelength (λU_2 and λD_2).

Next, in the second protection, when the wavelength variable subscriber device 20 and the wavelength variable communication device 10 are disconnected, the optical distribution device 100 switches the connection destination of the disconnected wavelength variable subscriber device 20 to the wavelength variable communication device 10 different from the disconnected wavelength variable communication device 10. For example, when communication between the wavelength variable subscriber device 20 #1 and the wavelength variable communication device 10 #1 is disconnected, the optical distribution device 100 executes the second protection and switches the connection destination of the port #1-1 in the optical distribution device 100 to the port #2-2 to switch the connection destination of the wavelength variable subscriber device 20 #1 to the wavelength variable communication device 10 #2. Then, by setting the transmission and reception wavelength of the wavelength variable communication device 10 #2 to the operating wavelength (λU_1 and λD_1), the communication between the wavelength variable subscriber device 20 #1 and the wavelength variable communication device 10 #2 can be started.

Further, in the optical communication system of this embodiment, the third protection may be executable. In the third protection, as in the first embodiment, the optical distribution device 100 switches the signal transmission path 200 to be used when the wavelength variable subscriber device 20 and the wavelength variable communication device 10 are disconnected.

In the protection method of the optical communication system described above, at least the first step of executing the first protection and the second step of executing the second protection are executed in an arbitrary order. Further, the third step of executing the third protection described above may be provided, and in this case, the first step, the second step, and the third step are executed in an arbitrary order.

In the optical communication system and the protection method for the optical communication system of this embodiment, when the wavelength variable subscriber device 20 is disconnected from the wavelength variable communication device 10, the first protection for switching the wavelength of the optical signal to be transmitted and received by the wavelength variable subscriber device 20 to a spare wavelength different from the operating wavelength and the second protection for switching the connection destination of the wavelength variable subscriber device 20 to the wavelength variable communication device 10 different from the disconnected wavelength variable communication device 10 can be executed.

By executing such first protection, the optical fiber transmission path 50 can be switched from the normal path 51 to the redundant path 52 to cope with the disconnection due to the abnormality or the like of the optical fiber transmission path 50. Further, by executing the second protection, the wavelength variable communication device 10 facing the wavelength variable subscriber device 20 can be changed to a new one, and it is possible to cope with the disconnection due to the abnormality or the like of the facing wavelength variable communication device 10.

Therefore, it is possible to cope with the disconnection due to the abnormality of both the wavelength variable communication device 10 and the optical fiber transmission path 50. Therefore, in any cases of when the wavelength variable communication device 10 is single-unit disabled, the optical fiber transmission path 50 is single-unit disabled, or the wavelength variable communication device 10 and the optical fiber transmission path 50 are multiple disabled, the communication can be restarted within a short time period. Specifically, for example, in not only disconnection of an optical fiber transmission path 50 between the optical multiplexing/demultiplexing device 40 and the optical distribution device 100, but also failure, function upgrade, maintenance, and the like of the wavelength variable communication device 10, the communication disconnection time period can be shortened. Furthermore, the number of wavelength variable subscriber devices 20 to be protection target can be minimized. In other words, the optical communication system and the protection method for the optical communication system having the above-described structure can achieve the same effects as those of the first embodiment.

Further, in the optical communication system and the protection method for the optical communication system of this embodiment, the third protection for switching the signal transmission path 200 used for communication between the optical distribution device 100 and the wavelength routing device 30 may be executable when the wavelength variable subscriber device 20 and the wavelength variable communication device 10 are disconnected. By making it possible to execute such third protection, the communication path can be made redundant in addition to the optical fiber transmission path 50 between the optical multiplexing/demultiplexing device 40 and the optical distribution 100, and also in the section between the optical distribution 100 and the wavelength routing device 30.

Third Embodiment

Figure 6:
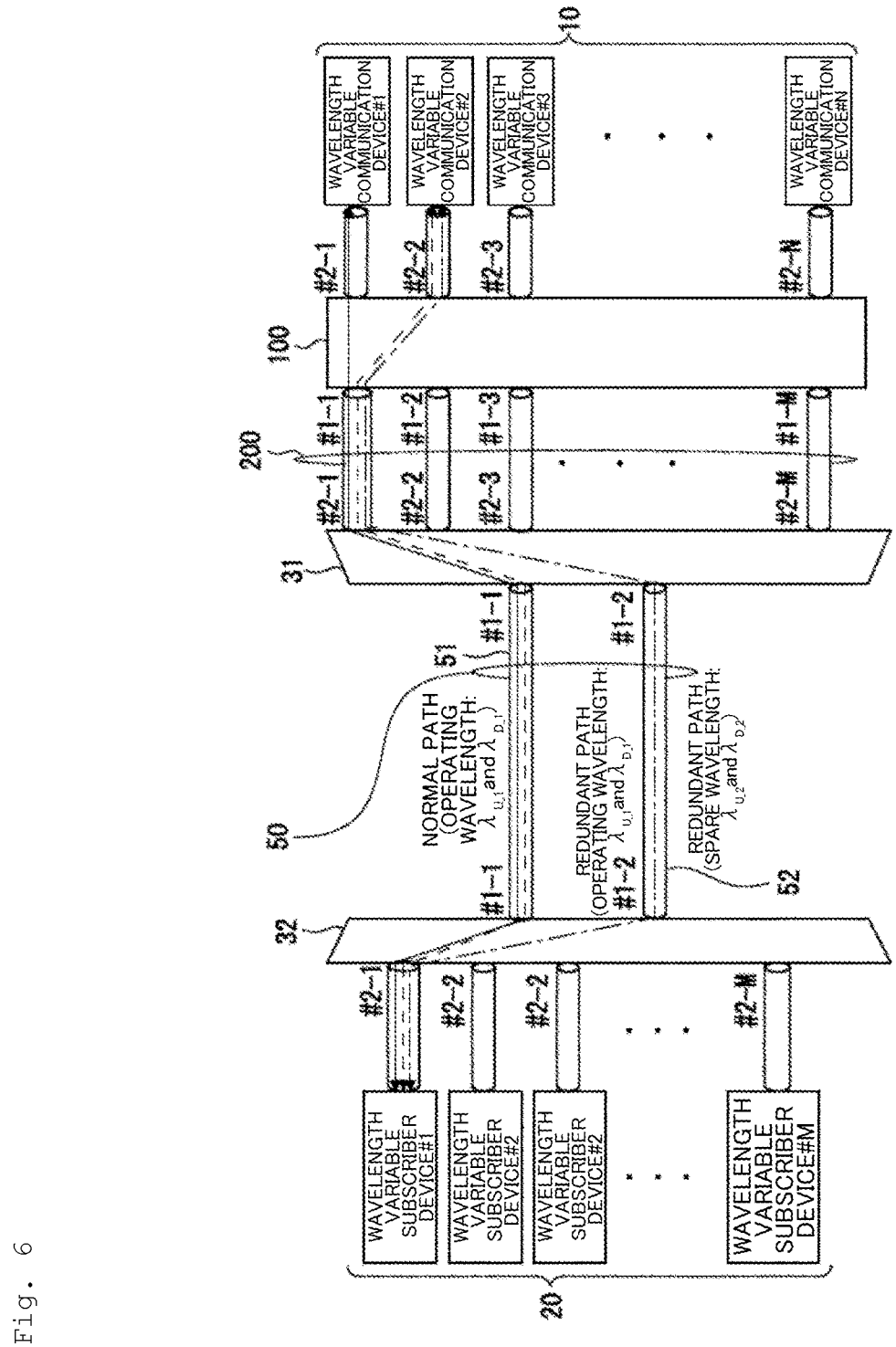
FIG. 6 is a diagram schematically showing an entire configuration of an optical communication system according to a third embodiment.

The third embodiment of the present disclosure will be described with reference to FIG. 6. FIG. 6 is a diagram schematically showing an entire configuration of the optical communication system.

In the third embodiment described here, the optical multiplexing/demultiplexing device on the wavelength variable subscriber device side is also changed to the wavelength routing device in the configuration of the second embodiment described above. The optical communication system and the protection method for the optical communication system according to the third embodiment will be described below mainly with respect to the difference from the second embodiment by taking the configuration of the second embodiment as an example. The structure in which the description is omitted is basically the same as that of the second embodiment.

As shown in FIG. 6, the optical communication system according to this embodiment includes the plurality of wavelength variable communication devices 10, the plurality of wavelength variable subscriber devices 20, a first wavelength routing device 31, a second wavelength routing device 32 and the optical distribution device 100. In this embodiment, each of the wavelength variable communication devices 10 can change the wavelength of the optical signal to be transmitted. Each of the wavelength variable subscriber devices 20 can also change the wavelength of the optical signal to be transmitted.

The first wavelength routing device 31 is connected to each of the wavelength variable communication devices 10. The second wavelength routing device 32 is connected to each of the wavelength variable subscriber devices 20. The first wavelength routing device 31 and the second wavelength routing device 32 are connected by the plurality of optical fiber transmission paths 50. In the example of the configuration described here, two of the normal path 51 and the redundant path 52 are laid as the plurality of optical fiber transmission paths 50.

In this embodiment, the optical distribution device 100 is provided between the first wavelength routing device 31 and each of the wavelength variable communication devices 10. The port on the wavelength variable subscriber device 20 side of the optical distribution device 100 is connected to the first wavelength routing device 31 via the plurality of signal transmission paths 200. The port on the wavelength variable communication device 10 side of the optical distribution device 100 is connected to each of the wavelength variable communication devices 10.

In the shown example of the configuration, for the wavelength variable communication device 10 side of the second wavelength routing device 32, the port #1-1 is connected to the normal path 51 of the optical fiber transmission path 50, and the port #1-2 is connected to the redundant path 52 of the optical fiber transmission path 50. In addition, the ports #2-1, #2-2, ..., #2-M on the wavelength variable subscriber device 20 side in the second wavelength routing device 32 are connected to the wavelength variable subscriber device 20 #1, the wavelength variable subscriber device 20 #2, ..., the wavelength variable subscriber device 20 #M, respectively.

In addition, on the wavelength variable subscriber device 20 side of the first wavelength routing device 31, the port #1-1 is connected to the normal path 51 of the optical fiber transmission path 50, and the port #1-2 is connected to the redundant path 52 of the optical fiber transmission path 50. The ports #2-1, #2-2, ..., #2-M on the wavelength variable communication device 10 side in the first wavelength routing device 31 are connected to the port #1-1, #1-2, ..., #1-M on the wavelength variable subscriber device 20 in the optical distribution device 100 by M signal transmission paths 200, respectively. Then, the ports #2-1, #2-2, ..., #2-N on the wavelength variable communication device 10 side in the optical distribution device 100 are connected to the wavelength variable communication device 10 #1, the wavelength variable communication device 10 #2, ..., the wavelength variable communication device 10 #N, respectively.

The optical distribution device 100 outputs the optical signals inputted from the respective ports to the port in which a connection relation is set as a connection port to the port. The connection relation between the ports in the optical distribution device 100 can be arbitrarily changed and set.

The first wavelength routing device 31 outputs the optical signals inputted to the ports #1-1, #1-2 on the wavelength variable subscriber device 20 side to the ports uniquely determined by a combination of the wavelength of the optical signal and the port to which the optical signal is inputted on the wavelength variable communication device 10 side. Further, the first wavelength routing device 31 outputs the optical signals inputted to each of the ports #2-1 to #2-M on the wavelength variable communication device 10 side to the ports uniquely determined by a combination of the wavelength of the optical signal and the port to which the optical signal is inputted on the wavelength variable subscriber device 20 side.

The second wavelength routing device 32 outputs the optical signals inputted to the ports #1-1, #1-2 on the wavelength variable communication device 10 side to the ports uniquely determined by a combination of the wavelength of the optical signal and the port to which the optical signal is inputted on the wavelength variable subscriber device 20 side. Further, the second wavelength routing device 32 outputs the optical signals inputted to each of the ports #2-1 to #2-M on the wavelength variable subscriber device 20 side to the ports uniquely determined by a combination of the wavelength of the optical signal and the port to which the optical signal is inputted on the wavelength variable communication device 10 side. In this case, the input/output characteristics of the first wavelength routing device 31 and the second wavelength routing device 32 are the same as those shown in FIG. 5 described in the second embodiment, for example.

Next, the protection when communication between the wavelength variable subscriber device 20 and the wavelength variable communication device 10 is disconnected in the optical communication system of this embodiment will be described. In the optical communication system of this embodiment, the first protection and the second protection can be executed.

First, in the first protection, the wavelength variable subscriber device 20 and the wavelength variable communication device 10 switches the wavelength of an optical signal to be transmitted from the operating wavelength to a spare wavelength, when communication between the wavelength variable subscriber device 20 and the wavelength variable communication device 10 is disconnected. Here, the spare wavelength is different from the operating wavelength. That is, the wavelength variable subscriber device 20 and the wavelength variable communication device 10 can execute the first protection for switching the wavelength of the optical signal transmitted by each of them to the spare wavelength different from the operating wavelength when the communication is disconnected.

As described above, the first wavelength routing device 31 outputs the optical signals inputted to the port #1-1, #1-2 on the wavelength variable subscriber device 20 side to the port #2-1 to #2-M on the wavelength variable communication device 10 side according to the input/output characteristics shown in FIG. 5. The input/output characteristics of the first wavelength routing device 31 are set so that the output port when the operating wavelength is inputted to the port #1-1 and the output port when the spare wavelength is inputted to the port #1-2 are the same for each of the wavelength variable subscriber devices 20. Therefore, when the transmission and reception wavelengths of the wavelength variable subscriber device 20 and the wavelength variable communication device 10 are switched from the operating wavelength to the spare wavelength, the optical fiber transmission path 50 to be used can be switched from the normal path 51 to the redundant path 52 without changing the connection relation between the wavelength variable subscriber device 20 and the wavelength variable communication device 10 in the case of when the second protection described later is not executed.

For example, when communication between the variable wavelength subscriber device 20 #1 and the variable wavelength communication device 10 #1 is disconnected, the variable wavelength subscriber device 20 #1 and the variable wavelength communication device 10 #1 execute the first protection, thereby switching the transmission and reception wavelengths of both from the operating wavelength ($\lambda U\_1$ and $\lambda D\_1$) to the spare wavelength ($\lambda U\_2$ and $\lambda D\_2$). According to the input/output characteristics of FIG. 5, the optical signals of the spare wavelength ($\lambda U\_2$ and $\lambda D\_2$) inputted and outputted from the wavelength variable subscriber device 20 #1 to the port #2-1 of the second wavelength routing device 32 are inputted and outputted from the port #1-2 of the second wavelength routing device 32 to the redundant path 52. On the other hand, the optical signals of the spare wavelength ($\lambda U\_2$ and $\lambda D\_2$) inputted and outputted from the redundant path 52 to the port #1-2 of the first wavelength routing device 31 are inputted and outputted from the port #2-1 of the first wavelength routing device 31 to the port #1-1 of the optical distribution device 100. Then, the optical signal inputted and outputted to and from the port #1-1 of the optical distribution device 100 is inputted and outputted to and from the wavelength variable communication device 10 #1. Therefore, communication by the redundant path 52 can be started between the wavelength variable subscriber device 20 #1 and the wavelength variable communication device 10 #1.

Next, in the second protection, when the wavelength variable subscriber device 20 and the wavelength variable communication device 10 are disconnected, the optical distribution device 100 switches the disconnected connection destination of the wavelength variable subscriber device 20 to the wavelength variable communication device 10 different from the disconnected wavelength variable communication device 10. For example, when communication between the wavelength variable subscriber device 20 #1 and the wavelength variable communication device 10 #1 is disconnected, the optical distribution device 100 executes the second protection and switches the connection destination of the port #1-1 in the optical distribution device 100 to the port #2-2 to switch the connection destination of the wavelength variable subscriber device 20 #1 to the wavelength variable communication device 10 #2. Then, by setting the transmission and reception wavelength of the wavelength variable communication device 10 #2 to the operating wavelength ($\lambda U\_1$ and $\lambda D\_1$), the communication between the wavelength variable subscriber device 20 #1 and the wavelength variable communication device 10 #2 can be started.

In the protection method of the optical communication system described above, at least the first step of executing the first protection and the second step of executing the second protection are executed in an arbitrary order.

In the optical communication system and the protection method for the optical communication system of this embodiment, when the wavelength variable subscriber device 20 and the wavelength variable communication device 10 are disconnected, the first protection for switching the wavelength of then optical signal transmitted by each of the wavelength variable subscriber device 20 and the wavelength variable communication device 10 to the spare wavelength different from the operating wavelength, and the second protection for switching the connection destination of the wavelength variable describer device 20 to the wavelength variable communication device 10 different from the disconnected wavelength variable communication device 10 are executable.

By executing such first protection, the optical fiber transmission path 50 can be switched from the normal path 51 to the redundant path 52 to cope with the disconnection due to the abnormality or the like of the optical fiber transmission path 50. Further, by executing the second protection, the wavelength variable communication device 10 facing the wavelength variable subscriber device 20 can be changed to a new one, and it is possible to cope with the disconnection due to the abnormality or the like of the facing wavelength variable communication device 10.

Therefore, it is possible to cope with the disconnection due to the abnormality of both the wavelength variable communication device 10 and the optical fiber transmission path 50. Therefore, in any case of the case when the wavelength variable communication device 10 is single-unit disabled, the optical fiber transmission path 50 is single-unit disabled, or the wavelength variable communication device 10 and the optical fiber transmission path 50 are multiple disabled, the communication can be restarted in a short time period. Specifically, for example, in not only disconnection of an optical fiber transmission path 50 between the second wavelength routing device 32 and the optical distribution device 100, but also failure, function upgrade, maintenance, and the like of the wavelength variable communication device 10, the communication disconnection time period can be shortened. Furthermore, the number of wavelength variable subscriber devices 20 to be protection target can be minimized. That is, the optical communication system and the protection method for the optical communication system having the above described configuration can achieve the same effects as those of the second embodiment.

INDUSTRIAL APPLICABILITY

The present disclosure can be used for the optical communication system and the protection method of the optical communication system, which perform communication between the plurality of wavelength variable communication devices and the plurality of wavelength variable subscriber devices via the plurality of optical fiber transmission paths.

REFERENCE SIGNS LIST

10 Wavelength variable communication device
20 Wavelength variable subscriber device
30 Wavelength routing device
31 First wavelength routing device
32 Second wavelength routing device
40 Optical multiplexing/demultiplexing device
50 Optical fiber transmission path
51 Normal path
52 Redundant path
100 Optical distribution device
200 Signal transmission path
201 First signal transmission path
202 Second signal transmission path

The invention claimed is:
1. An optical communication system comprising:
a plurality of wavelength variable communication devices capable of changing a wavelength of an optical signal to be transmitted;
a plurality of wavelength variable subscriber devices capable of changing a wavelength of an optical signal to be transmitted and received;
a wavelength routing device connected to each of the wavelength variable communication devices;
an optical multiplexing/demultiplexing device connected to each of the wavelength variable subscriber devices;
a plurality of optical fiber transmission paths connecting the wavelength routing device and the optical multiplexing/demultiplexing device; and
an optical distribution device provided between the wavelength routing device and the optical multiplexing/demultiplexing device, wherein
the wavelength routing device outputs an optical signal inputted from a port on the wavelength variable subscriber device side to a port uniquely determined by a combination of the wavelength of the optical signal and the port to which the optical signal is inputted, the wavelength variable subscriber device is capable of executing a first protection for switching the wavelength of the optical signal to be transmitted and received to a spare wavelength different from an operating wavelength when the wavelength variable subscriber device and the wavelength variable communication device are disconnected, and the optical distribution device is capable of executing a second protection for switching the optical fiber transmission path to be used when the wavelength variable subscriber device and the wavelength variable communication device are disconnected.

2. An optical communication system comprising:

a plurality of wavelength variable communication devices capable of changing a wavelength of an optical signal to be transmitted;

a plurality of wavelength variable subscriber devices capable of changing a wavelength of an optical signal to be transmitted and received;

a wavelength routing device connected to each of the wavelength variable communication devices;

an optical multiplexing/demultiplexing device connected to each of the wavelength variable subscriber devices;

a plurality of optical fiber transmission paths connecting the wavelength routing device and the optical multiplexing/demultiplexing device; and an optical distribution device provided between the wavelength routing device and each of the wavelength variable communication devices, wherein the wavelength routing device outputs the optical signal inputted from a port on the wavelength variable subscriber device side to a port uniquely determined by a combination of the wavelength of the optical signal and the port to which the optical signal is inputted, the wavelength variable subscriber device is capable of executing a first protection for switching the wavelength of the optical signal to be transmitted and received to a spare wavelength different from an operating wavelength when the wavelength variable subscriber device and the wavelength variable communication device are disconnected, and the optical distribution device is capable of executing a second protection for switching the connection destination of the wavelength variable subscriber device to the wavelength variable communication device different from the disconnected wavelength variable communication device when the wavelength variable subscriber device and the wavelength variable communication device are disconnected.

3. The optical communication system according to claim 1, wherein the wavelength routing device and the optical distribution device are connected by a plurality of signal transmission paths, and the optical distribution device is capable of executing a third protection for switching the signal transmission path to be used when the wavelength variable subscriber device and the wavelength variable communication device are disconnected.

4. The optical communication system according to claim 2, wherein the wavelength routing device and the optical distribution device are connected by a plurality of signal transmission paths, and the optical distribution device is capable of executing a third protection for switching the signal transmission path to be used when the wavelength variable subscriber device and the wavelength variable communication device are disconnected.

5. An optical communication system comprising:

a plurality of wavelength variable communication devices capable of changing a wavelength of an optical signal to be transmitted;

a plurality of wavelength variable subscriber devices capable of changing a wavelength of an optical signal to be transmitted and received;

a first wavelength routing device connected to each of the wavelength variable communication devices;

a second wavelength routing device connected to each of the wavelength variable subscriber devices;

a plurality of optical fiber transmission paths connecting the first wavelength routing device and the second wavelength routing device; and an optical distribution device provided between the first wavelength routing device and each of the wavelength variable communication devices, wherein the first wavelength routing device outputs the optical signal inputted from a port on the wavelength variable subscriber device side to a port uniquely determined by a combination of the wavelength of the optical signal and the port to which the optical signal is inputted, the second wavelength routing device outputs the optical signal inputted from a port on the wavelength variable communication device side to a port uniquely determined by a combination of the wavelength of the optical signal and the port to which the optical signal is inputted, the wavelength variable subscriber device and the wavelength variable communication device are capable of executing a first protection for switching the wavelength of the respective optical signal to be transmitted and received to a spare wavelength different from an operating wavelength when the wavelength variable subscriber device and the wavelength variable communication device are disconnected, and the optical distribution device is capable of executing a second protection for switching the connection destination of the wavelength variable subscriber device to the wavelength variable communication device different from the disconnected wavelength variable communication device when the wavelength variable subscriber device and the wavelength variable communication device are disconnected.

6. A protection method for an optical communication system comprising a first step and a second step, the optical communication system comprising:

a plurality of wavelength variable communication devices capable of changing a wavelength of an optical signal to be transmitted;

a plurality of wavelength variable subscriber devices capable of changing a wavelength of an optical signal to be transmitted and received;

a wavelength routing device connected to each of the wavelength variable communication devices;

an optical multiplexing/demultiplexing device connected to each of the wavelength variable subscriber devices;

a plurality of optical fiber transmission paths connecting the wavelength routing device and the optical multiplexing/demultiplexing device; and an optical distribution device provided between the wavelength routing device and the optical multiplexing/demultiplexing device, wherein the wavelength routing device outputs an optical signal inputted from a port on the wavelength variable subscriber device side to a port uniquely determined by a combination of the wavelength of the optical signal and the port to which the optical signal is inputted, the first step being a step in which the wavelength variable subscriber device switches the wavelength of the optical signal to be transmitted and received to a spare wavelength different from an operating wavelength when the wavelength variable subscriber device and the wavelength variable communication device are disconnected, the second step being a step in which the optical distribution device switches the optical fiber transmission path to be used when the wavelength variable subscriber device and the wavelength variable communication device are disconnected, the first step and the second step being executed in an arbitrary order.

7. A protection method for an optical communication system comprising a first step and a second step, the optical communication system comprising:

a plurality of wavelength variable communication devices capable of changing a wavelength of an optical signal to be transmitted;

a plurality of wavelength variable subscriber devices capable of changing a wavelength of an optical signal to be transmitted and received;

a wavelength routing device connected to each of the wavelength variable communication devices;

an optical multiplexing/demultiplexing device connected to each of the wavelength variable subscriber devices;

a plurality of optical fiber transmission paths connecting the wavelength routing device and the optical multiplexing/demultiplexing device; and an optical distribution device provided between the wavelength routing device and each of the wavelength variable communication devices, wherein the wavelength routing device outputs the optical signal inputted from a port on the wavelength variable subscriber device side to a port uniquely determined by a combination of the wavelength of the optical signal and the port to which the optical signal is inputted, the first step being a step in which the wavelength variable subscriber device switches the wavelength of the optical signal to be transmitted and received to a spare wavelength different from an operating wavelength when the wavelength variable subscriber device and the wavelength variable communication device are disconnected, the second step being a step in which the optical distribution device switches the connection destination of the wavelength variable subscriber device to the wavelength variable communication device different from the disconnected wavelength variable communication device when the wavelength variable subscriber device and the wavelength variable communication device are disconnected, the first step and the second step being executed in an arbitrary order.

8. The protection method for the optical communication system according to claim 6, further comprising a third step, wherein the wavelength routing device and the optical distribution device are connected by a plurality of signal transmission paths, the third step being a step in which the optical distribution device switches the signal transmission path to be used when the wavelength variable subscriber device and the wavelength variable communication device are disconnected, the first step, the second step and the third step being executed in an arbitrary order.

9. The protection method for the optical communication system according to claim 7, further comprising a third step, wherein the wavelength routing device and the optical distribution device are connected by a plurality of signal transmission paths, the third step being a step in which the optical distribution device switches the signal transmission path to be used when the wavelength variable subscriber device and the wavelength variable communication device are disconnected, the first step, the second step and the third step being executed in an arbitrary order.

10. A protection method for an optical communication system comprising a first step and a second step, the optical communication system comprising:

a plurality of wavelength variable communication devices capable of changing a wavelength of an optical signal to be transmitted;

a plurality of wavelength variable subscriber devices capable of changing a wavelength of an optical signal to be transmitted and received;

a first wavelength routing device connected to each of the wavelength variable communication devices;

a second wavelength routing device connected to each of the wavelength variable subscriber devices;

a plurality of optical fiber transmission paths connecting the first wavelength routing device and the second wavelength routing device; and an optical distribution device provided between the first wavelength routing device and each of the wavelength variable communication devices, wherein the first wavelength routing device outputs the optical signal inputted from a port on the wavelength variable subscriber device side to a port uniquely determined by a combination of the wavelength of the optical signal and the port to which the optical signal is inputted, and the second wavelength routing device outputs the optical signal inputted from a port on the wavelength variable communication device side to a port uniquely determined by a combination of the wavelength of the optical signal and the port to which the optical signal is inputted, the first step being a step in which the wavelength variable subscriber device and the wavelength variable communication device switch the wavelength of the respective optical signal to be transmitted and received to a spare wavelength different from an operating wavelength when the wavelength variable subscriber device and the wavelength variable communication device are disconnected, the second step being a step in which the optical distribution device switches the connection destination of the wavelength variable subscriber device to the wavelength variable communication device different from the disconnected wavelength variable communication device when the wavelength variable subscriber device and the wavelength variable communication device are disconnected, the first step and the second step being executed in an arbitrary order.

\* \* \* \* \*